United States Patent
Matsumoto

[11] Patent Number: 6,139,980
[45] Date of Patent: Oct. 31, 2000

[54] READING METHOD OF READING INFORMATION FROM A RECORDING MEDIUM AND MEDIUM USED THEREFOR

[75] Inventor: Koji Matsumoto, Kawasaki, Japan

[73] Assignee: Fujitsu Limited, Kawasaki, Japan

[21] Appl. No.: 08/966,891

[22] Filed: Nov. 10, 1997

[30] Foreign Application Priority Data

Jul. 2, 1997 [JP] Japan ................................... 9-177220

[51] Int. Cl.⁷ ........................................ G11B 5/60
[52] U.S. Cl. ............ 428/692; 428/694 R; 428/694 MM; 428/694 EC; 428/694 SC; 428/694 LE; 428/694 IS; 428/694 T; 428/694 TM; 428/900; 369/275.2; 369/275.3; 365/122; 360/59; 360/116; 346/74.2; 346/74.4
[58] Field of Search .................... 428/694 MM, 428/694 EC, 694 SC, 694 LE, 694 T, 694 TM, 694 IS, 900, 694 R; 369/275.2, 275.3; 365/122; 360/59, 116; 346/74.4, 74.2

[56] References Cited

U.S. PATENT DOCUMENTS

| | | | |
|---|---|---|---|
| 4,734,708 | 3/1988 | Saitoh | 346/74.4 |
| 5,202,862 | 4/1993 | Ohta et al. | 369/13 |
| 5,325,344 | 6/1994 | Ohta et al. | 369/13 |
| 5,481,410 | 1/1996 | Osato | 360/13 |
| 5,681,633 | 10/1997 | Onogi | 428/64.3 |
| 5,731,076 | 3/1998 | Liu | 428/332 |
| 5,814,418 | 9/1998 | Nishikiori | 428/694 ML |

FOREIGN PATENT DOCUMENTS

| | | |
|---|---|---|
| 57-069542 | 4/1982 | Japan . |
| 2037501 | 2/1990 | Japan . |
| 4 48406 | 2/1992 | Japan . |
| 4 53046 | 2/1992 | Japan . |
| 10 021598 | 1/1998 | Japan . |

*Primary Examiner*—Leszek Kiliman
*Attorney, Agent, or Firm*—Greer, Burns & Crain, Ltd.

[57] ABSTRACT

An information recording medium and a reading method thereof for realizing high density recording and recording/reading a direction of magnetization at minute bit length and bit width, which comprises a substrate having a first magnetic layer which is capable of thermo-magnetically recording and a second magnetic layer which is capable of being exchange coupled with the first magnetic layer formed thereon in this order, is performed by detecting a direction of magnetization transferred onto the second magnetic layer from variations in magnetic flux while emitting a light beam thereon.

17 Claims, 6 Drawing Sheets

READING METHOD OF READING INFORMATION FROM A RECORDING MEDIUM AND MEDIUM USED THEREFOR

BACKGROUND OF THE INVENTION

The present invention relates to an information recording medium for recording information on a magnetic layer in a corresponding direction of magnetization.

Hard disk devices (HD) and magneto-optical disk devices (MO) are the mainly used devices among recording/reading devices comprising an information recording medium. A HD comprises a magnetic medium having a magnetic layer of in-plane magnetic anisotropy. The HD also includes a magnetic head having a magnetic field generating unit for recording and a sensor unit for reading. The magnetic head is disposed as to be opposing a face of the magnetic medium for recording a recording bit in the magnetic medium by changing the direction of magnetic field of the magnetic head while rotating the magnetic medium. The recording bit stores therein a direction of magnetization in an in-plane direction which varies in correspondence with the information, and reading the information is performed by detecting an amplitude of a readout signal with the sensor unit for reading. Presently, an information recording density of 1 Gbit/inch$^2$ is realized by using a thin-film sensor.

On the other hand, an MO comprises a magneto-optical medium having a magnetic layer of perpendicular magnetic anisotropy. The MO also includes a sensor unit for emitting laser beams to the medium and receiving the reflections thereof, and a magnetic field generating unit. A recording bit is recorded in the magneto-optical medium by emitting laser beams and applying a magnetic field while rotating the magneto-optical medium. The recording bit stores therein a direction of magnetization in a perpendicular direction which varies in correspondence with the information. To read the information, by a rotating direction of a plane of polarization from the received reflected light of the laser beam is defected. By using a recently developed magnetically-induced super resolution (MSR) technique, an information recording density of about 3 Gbit/inch$^2$ is realized.

In order to further improve the recording density of media in such HDs and MOs as explained above, the size of the bit of the media, i.e. the bit length in a tangential direction and the bit width in a radial direction, needs to be reduced.

In order to realize a recording density of 1.5 Gbit/inch$^2$ in a HD, a track pitch of approximately 2.5 μm and a minimum bit length of approximately 0.14 μm is required. Likewise, the track pitch and minimum bit length need to be approximately 1.25 μm and 0.09 μm, respectively, if a recording density of 5 Gbit/inch$^2$ is to be realized. In the case of an MO, a recording density of 1 Gbit/inch$^2$ is already realized with a track pitch of 1.1 μm and minimum bit length of approximately 0.48 μm. In order to realize a recording density of 3.5 Gbit/inch$^2$, the track pitch and minimum bit length need to be 0.7 μm and approximately 0.27 μm, respectively.

It is obvious from the above explanations that in obtaining a high recording density of the media of HDs and MOs, a HD has an advantage in that the minimum bit length thereof can be made shorter than a minimum bit length of an MO by the use of a MR head, but is disadvantaged in that the track pitch is broader. It is difficult to provide a track pitch of 1 μm or less due to problems in tracking techniques and head processing techniques. An MO has an advantage in that the track pitch is narrower than a track pitch in a HD, but disadvantaged in that the minimum bit length is longer and its resolution can not be made to be 0.1 μm or less as it is possible by using a MR head, even by using MSR techniques. By specifying the magnetic layer of the magneto-optical medium in an MO, it is possible to read a recording bit of a minimum bit length of approximately 0.1 μm, but such a case presents a drawback in that a C/N of a magneto-optical readout signal tends to be low.

BRIEF SUMMARY OF THE INVENTION

The present invention has been made to solve the above problems, and it is an object of the present invention to provide an information recording medium and a reading method thereof for realizing high density recording and recording/reading a direction of magnetization at minute bit length and bit width. An information recording medium, includes a substrate having a first magnetic layer which is capable of thermo-magnetically recording and a second magnetic layer which is capable of being exchange coupled with the first magnetic layer formed thereon in this order. The recording medium is read by detecting a direction of magnetization transferred onto the second magnetic layer from variations in magnetic flux while emitting light beams thereon.

The information recording medium of the present invention is characterized in that it comprises a substrate, a first magnetic layer provided at a near side with respect to the substrate, which is capable of thermo-magnetically recording, and a second magnetic layer provided at a far side with respect to the substrate and which has a temperature characteristic by which a direction of magnetization recorded on the first magnetic layer is transferred thereon by exchange coupling force.

Thus, recording can be performed with a minute recording bit, since the direction of magnetizing is thermo-magnetically recorded on the first magnetic layer provided at the near side with respect to the substrate by emitting light beams to the side of the substrate while applying a magnetic field. Reading is performed by transferring the direction of magnetization of the first magnetic layer onto a region of the second magnetic layer which temperature has been raised due to light beam emission, and by detecting variations in magnetic flux by means of a magnetic head arranged as to be opposing the second magnetic layer provided at the far side with respect to the substrate, whereby the direction of magnetization transferred onto the second magnetic layer can be read at high resolutions.

The information recording medium of the present invention is characterized in that it is capable of reading a recording bit which is smaller in size than a spot diameter of an emitted light beam, wherein the information recording medium comprises a substrate, a first magnetic layer provided at a near side with respect to the substrate, which is capable of thermo-magnetically recording, a second magnetic layer provided at a far side with respect to the substrate and which has a temperature characteristic by which a direction of magnetization recorded on the first magnetic layer is transferred thereon by exchange coupling force, and a controlling layer provided between the first magnetic layer and the second magnetic layer for controlling the exchange coupling force.

Thus, recording can be performed with a minute recording bit, since the direction of magnetizing is thermo-magnetically recorded on the first magnetic layer provided at the near side with respect to the substrate by emitting laser beams to the side of the substrate while applying a magnetic field. At the time of reading, the controlling layer controls the exchange coupling force between the first and second magnetic layers by utilizing a temperature gradient in the tangential direction, and the direction of magnetization of the first magnetic layer is transferred onto the minute recording bit of the second magnetic layer by forming a mask region within the beam spot. Variations in magnetic flux are then detected by means of a magnetic head arranged as to be opposing the second magnetic layer provided at the far side with respect to the substrate, whereby the direction of magnetization transferred onto the second magnetic layer can be read at high resolutions.

The reading method of the information recording medium of the present invention is characterized in that it comprises a step of an emitting light beam from a side of the substrate so that direction of magnetization recorded on the first magnetic layer is transferred onto the second magnetic layer, a step of detecting variations in magnetic flux in a region of the second magnetic layer corresponding to an irradiated region by the light beam by means of a magnetic head which moves relative to the information recording medium, and a step of reading an information recorded in the information recording medium based on the detected results.

Thus, by thermo-magnetically recording a direction of magnetization on the first magnetic layer, a recording bit which is minute in a diametric direction is recorded which is then transferred onto the second magnetic layer only at a specified temperature region obtained by raising the temperature of the medium through the emitting light beam from the side of the substrate. In this way, the minute recording bit transferred onto the second magnetic layer can be read at high resolutions and high signal levels by detecting variations in magnetic flux of the second magnetic layer by means of a magnetic head.

The above and further objects and features of the invention will more fully be apparent form the following detailed description with accompanying drawings.

DETAILED DESCRIPTION OF THE INVENTION

The present invention will now be explained in details with reference to the drawings showing embodiments thereof.
Embodiment 1

Figure 1:
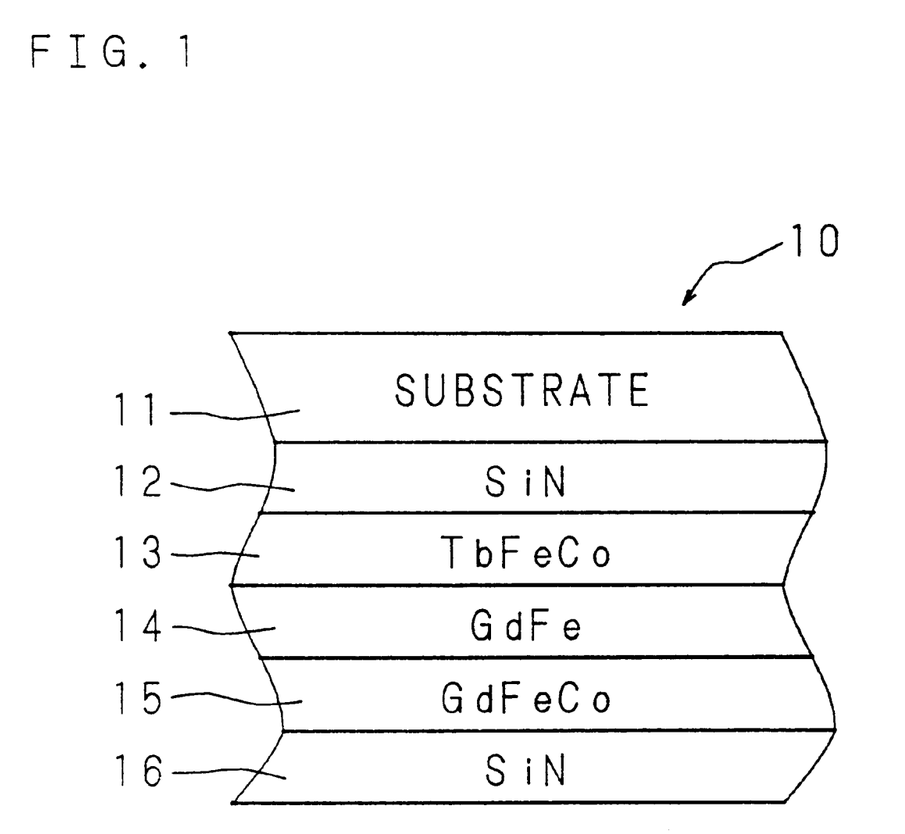
FIG. 1 is a diagram showing a structure of a film of an information recording medium according to embodiment 1.

FIG. 1 is a diagram showing a structure of a film of an information recording medium according to embodiment 1. The information recording medium 10 is a MSR medium of a disk-shape having a substrate 11 with guiding grooves provided on the surface thereof on which there are laminated a protecting layer 12, a recording layer 13 as the first magnetic layer, an intermediate layer 14 as the controlling layer, a reading layer 15 as the second magnetic layer, and a protecting layer 16 in this order. The composition, film thickness and producing conditions of each of the layers are shown in TABLE 1. It should be noted that the films of each of the layers are obtained by DC magnetron spattering method, and the recording layer 13 is rare-earth magnetization dominant (hereinafter referred to as "RE rich") with a compensation temperature of approximately 130° C. The reading layer 15 is transition-metal magnetization dominant (hereinafter referred to as "TM rich".

On the information recording medium 10 of the above structure, information is thermo-magnetically recorded by land/groove recording. At the time of recording, a laser beam is emitted onto the substrate 11 while applying a magnetic field after the direction of magnetization of the recording layer 13 is oriented as to face a predetermined direction, thereby forming a recording bit on the recording layer 13 through the light modulating recording method. The laser beam used in this embodiment is emitted by simple emission with a wave length of 680 mm, a NA of 0.55, a recording power of 10 mW, and a duty of 50%. The linear velocity of the medium is 10 m/s, and the bit length and the bit interval are 0.1 $\mu$m (50 MHz), respectively. It should be noted that although the embodiment employs the light modulating recording method for forming a recording bit on the recording layer 13, it is not limited to this, and a magnetic field modulating recording method may be employed in which the magnetic field is altered to be positive/negative.

Figure 2:
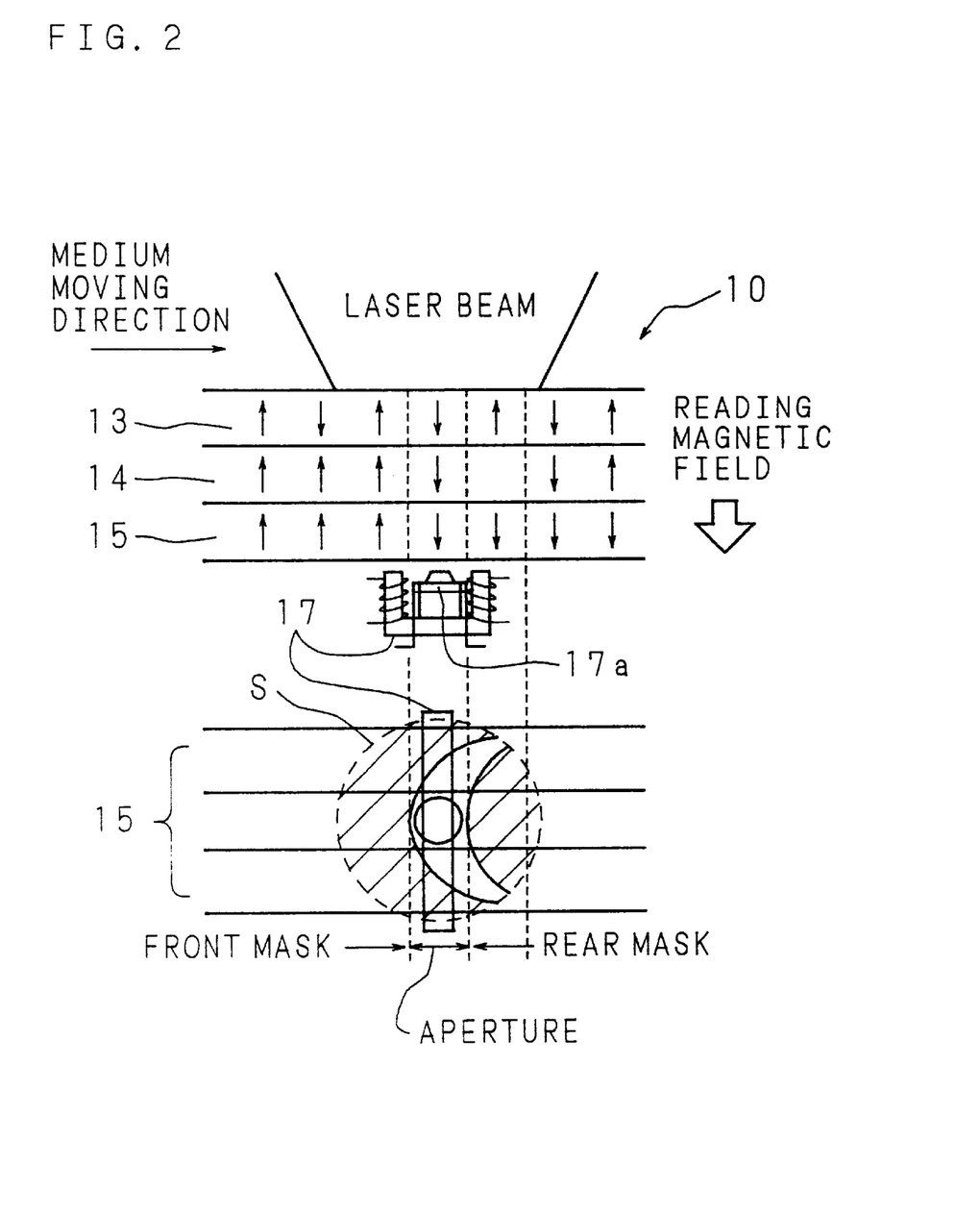
FIG. 2 is a diagram showing a magnetizing condition at the time of reading the information recording medium according to embodiment 1.

The reading method of the information recording medium 10 in which an information has been recorded in the above mentioned manner will now be explained. FIG. 2 is a diagram showing the magnetizing condition of the information recording medium at the time of reading and a magnetic head, and the same as viewed from the side closer to the reading layer 15. It should be noted that the substrate 11 and the protecting layers 12, 16 have been omitted in FIG. 2. While a laser beam is emitted onto the side of the substrate 11 (a closer side with respect to the recording layer 13) at a reading power of 3 mW, a reading magnetic field is applied to a proximity of the region onto which the laser beam is emitted, and the direction of magnetization of the reading layer 15 is read out by a magnetic head 17 disposed as to be opposing the side of the protecting layer 16 (a closer side with respect to the reading layer 15). The magnetic head 17 comprises an MR (magneto resistive) element 17a and is arranged for reading out the recording bit of the reading layer 15 which corresponds to the region onto which the laser beam is emitted.

Figure 3:
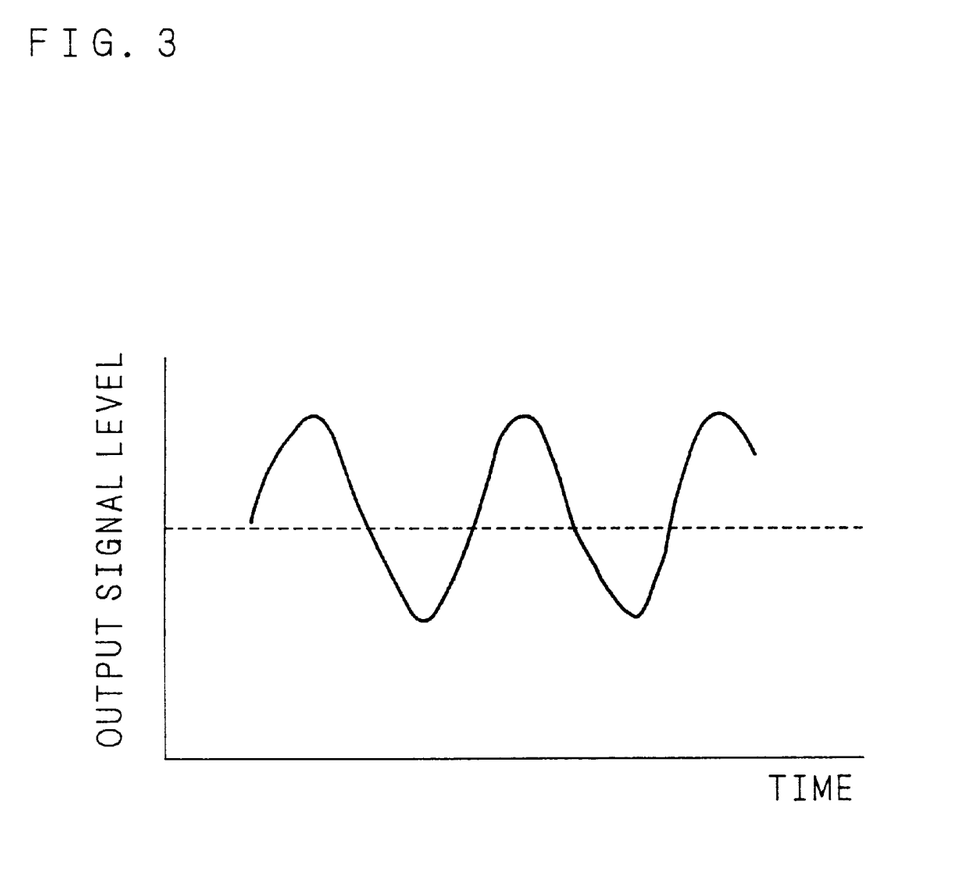
FIG. 3 is a diagram showing a reading waveform of the information recording medium according to embodiment 1.

When irradiating a laser beam onto the substrate 11 of the information recording medium 10, a temperature gradient in the tangential direction occurs on the recording layer 13, the intermediate layer 14, and the reading layer 15, and a front mask region and a rear mask region are formed in a region of the reading layer 15 which corresponds to laser spot S as shown in FIG. 2. At an aperture formed between the two mask regions, the recording bit of the recording layer 13 is transferred onto the reading layer 15, whereby the recorded bit is read out by the magnetic head 17. FIG. 3 is a graph showing the waveform of a magnetic readout signal of which variations in magnetic flux have been detected by MR element 17a, and the vertical and horizontal axis represent an output signal level and time, respectively. It is obvious from the graph that the direction of magnetization of the readout layer 15 is read out by magnetic reading. It has also been checked for the influence of crosstalk from a neighboring track, whereby it became obvious that no crosstalks were detected though the size of the MR element 17a in the direction of the track width was 1 μm.

It can be understood from the above results that at the time of recording, the information recording medium 10 of the present invention is capable of forming a bit of small bit width by applying a magnetic field while irradiating a laser beam, and at the time of reading, capable of decreasing crosstalks by transferring a recording bit of small bit length and bit width by forming an aperture smaller in size than a laser spot S obtained by emitting a laser beam. The present invention is also capable of obtaining magnetic readout signals of high resolutions and high signal levels by reading with the MR element 17a. Although it is generally difficult to perform tracking control due to eccentricities of the medium, a mask formed on a neighboring track in the present embodiment prevents detection of magnetic signals of the neighboring track ever when eccentricities occur, and thereby decreases crosstalks.

Embodiment 2

Figure 4:
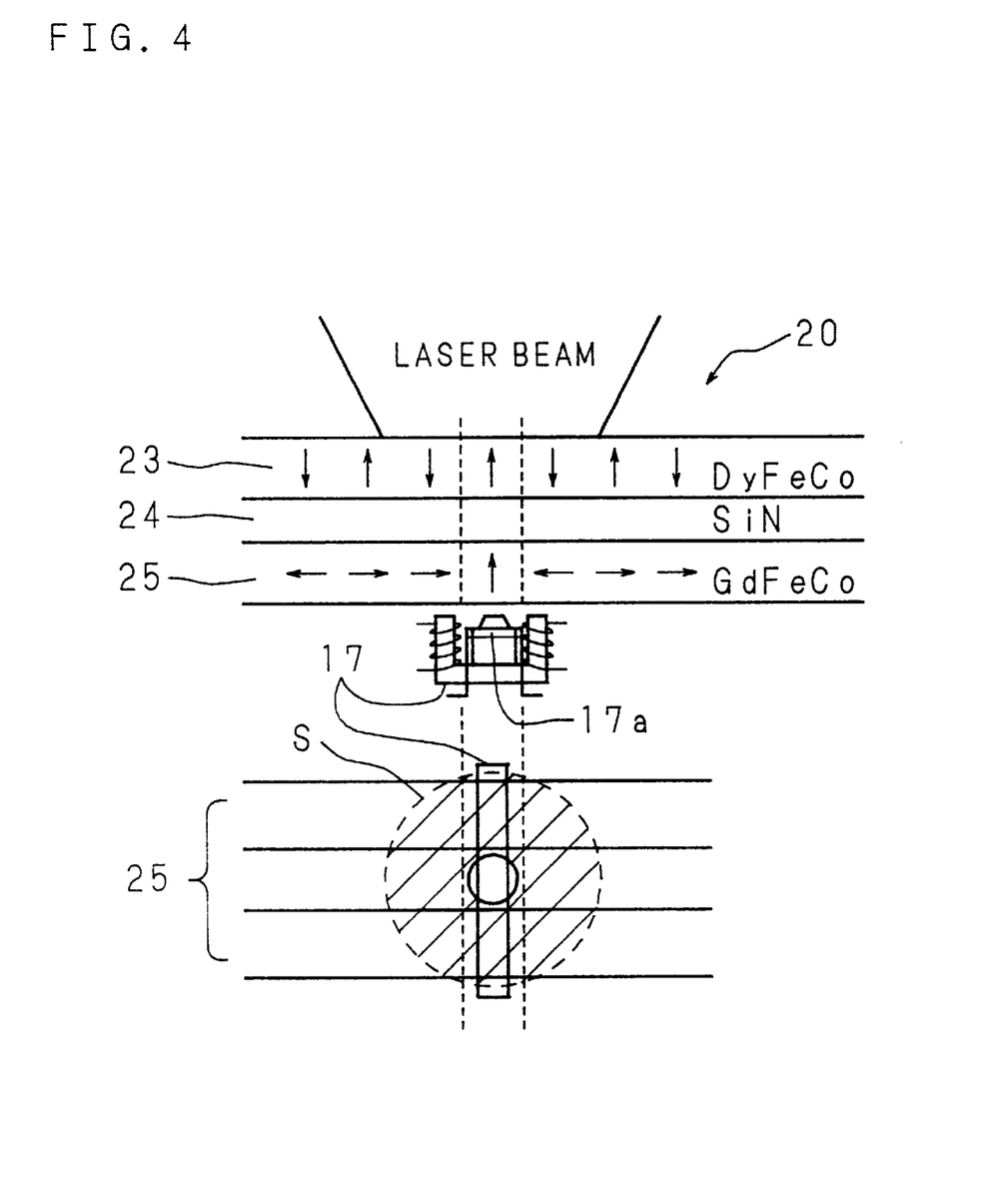
FIG. 4 is a diagram showing a magnetizing condition at the time of reading the information recording medium according to embodiment 2.

Next, the MSR medium of the magnetostatic coupling type will be explained. FIG. 4 is a diagram showing the magnetizing condition of the information recording medium at the time of reading and a magnetic head, and the same as viewed from the side closer to the reading layer 15. As shown in FIG. 4, the information recording medium 20 is a MSR medium of a disk-shape having a substrate with guiding grooves provided on the surface thereof on which there are laminated a protecting layer, a recording layer 23 as the first magnetic layer, an intermediate layer 24 as the controlling layer, a reading layer 25 as the second magnetic layer, and a protecting layer in this order. It should be noted that the substrate and the protecting layers have been omitted from the information recording medium 20 in FIG. 4. The composition, film thickness and producing conditions of each of the layers are shown in TABLE 2. It should be noted that the films of each of the layers are obtained by the DC magnetron spattering method, and the recording layer 23 is TM rich with a compensation temperature of approximately −10° C. The reading layer 25 is RE rich, being in-plane magnetized at room temperature and having a compensation temperature of approximately 200° C. The reason for using DyFeCo as the recording layer 23 instead of TbFeCo is that DyFeCo presents a greater saturation magnetization value and a stronger magnetostatic coupling force.

On the information recording medium 20 of the above structure, information is thermo-magnetically recorded by land/groove recording. Methods and conditions for recording are the same as those of embodiment 1, and explanations thereof will be deleted. At the time of reading the information recording medium 20 on which the information has been recorded, the direction of magnetization of reading layer 25 is read out by means of a magnetic head 17 disposed as to oppose the side closer to the protecting layer, that is, the near side with respect to the reading layer 25, while emitting a laser beam at a reading power of 3 mW to the side of the substrate of the information recording medium 20, that is, the near side with respect to the recording layer 23. Since a magnetostatic coupling type information recording medium is capable of MSR reading without applying reading magnetic fields, the reading magnetic field at the time of reading is not applied in embodiment 2. The remaining steps for reading are the same as those of embodiment 1.

As shown in FIG. 4, when a laser beam is emitted onto the side of the substrate of the information recording medium 20, the temperature of the region of reading layer 25 corresponding to the laser spot S rises and the magnetization changes from in-plane magnetization to perpendicular magnetization. The control of the exchange coupling force of the intermediate layer 24 makes the direction of magnetization of the recording layer 23 to be transferred onto the reading layer 25, whereupon this direction is read out by the MR element 17a of the magnetic head 17. The obtained magnetic readout signal is the same as that as shown in FIG. 3, and it can be noted that the recording bit of the reading layer 25 has been read out by magnetic reading. It should be noted that no crosstalks from the neighboring track was detected.

It is obvious from the above results that at the time of recording, the information recording medium 20 of the present embodiment is capable of forming a bit of a small bit width by applying a magnetic field while emitting a laser beam. Further, at the time of reading, the information recording medium 20 is capable of decreasing crosstalks by forming an aperture smaller in size than a laser spot S obtained by emitting a laser beam and changing the direction of magnetization of the reading layer 25 to a perpendicular magnetizing direction, and is also capable of obtaining magnetic readout signals of high resolutions and high signal levels by detecting variations in magnetic flux by the MR element 17a. A mask formed on the neighboring track prevents detection of magnetic signals of the neighboring track also when eccentricity of the information recording medium 20 occurs and thereby decreases crosstalks.

Embodiment 3

Figure 5:
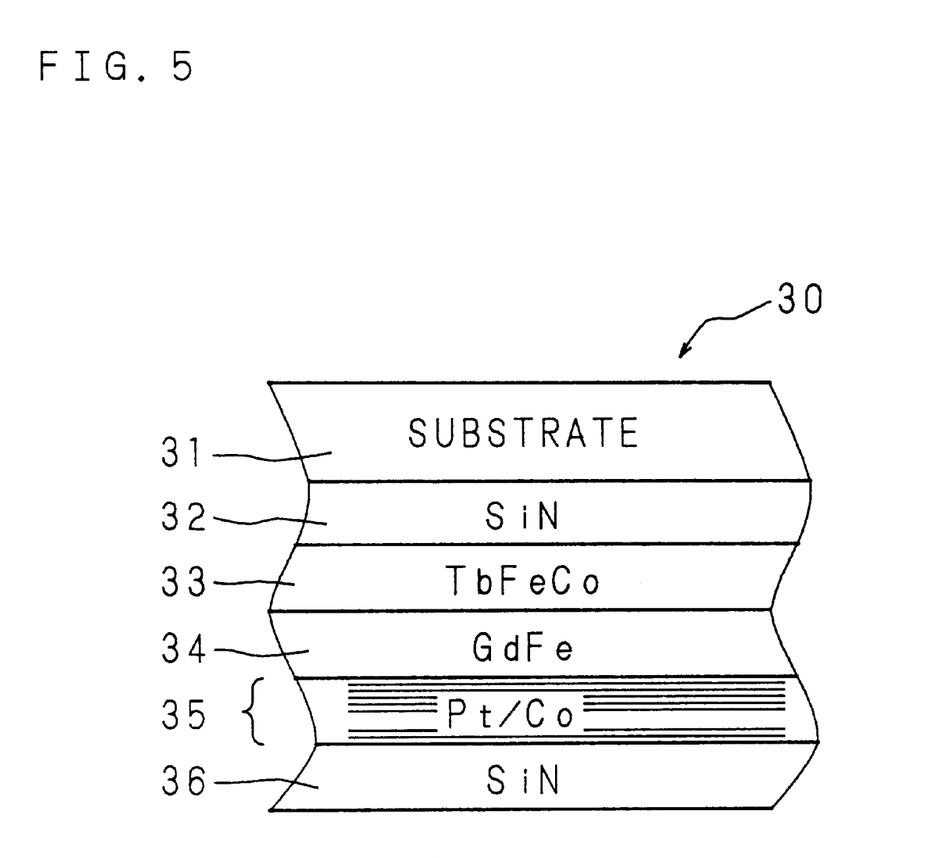
FIG. 5 is a diagram showing a structure of a film of an information recording medium according to embodiment 3.

Next, a case be explained in which the reading layer of the information recording medium according to the present invention is a composite film. FIG. 5 is a diagram showing a structure of a film of an information recording medium according to embodiment 3. The information recording medium 30 is a MSR medium of a disk-shape having a substrate 31 with guiding grooves provided on the surface thereof on which there are laminated a protecting layer 32, a recording layer 33 as the first magnetic layer, an intermediate layer 34 as the controlling layer, a reading layer 35 as the third magnetic layer, and a protecting layer 36 in this order. The composition, film thickness and producing conditions of each of the layers are shown in TABLE 3. It should be noted that the films of each of the layers are obtained by DC magnetron spattering method, and the recording layer 33 is RE rich with a compensation temperature of approximately 130° C. The reading layer 35 is a composite film of Pt/Co, and since the saturation magnetization value of a Pt/Co composite layer is larger than a value of a GdFeCo single layered film, a greater magnetic readout signal can be obtained.

On the information recording medium 30 of the above structure, information is thermo-magnetically recorded with the conditions and steps thereof being the same as those in embodiment 1, and the information is read out with the conditions and steps thereof also being the same as those in embodiment 1. The magnetizing condition at the time of reading is the same as that as shown in FIG. 2. When emitting a laser beam to the side of the substrate 31 of the information recording medium 30, a front mask and a rear mask region are formed on a region of the reading layer 35 corresponding to the laser spot. At an aperture formed between both mask regions, a recording bit of recording layer 33 is transferred which is read out by the magnetic head. The readout signal thus obtained has a size approximately thrice as large as that obtained in embodiment 1. It should be noted that the applied reading magnetic field was 600 Oe.

It is obvious from the above results that the same effects as those in embodiment 1 could be obtained with the information recording medium 30, and that the information recording medium 30 is capable of reading out a read out signal larger in signal level as that of embodiment 1 by employing a Pt/Co composite film for the reading layer 35.

Embodiment 4

Figure 6:
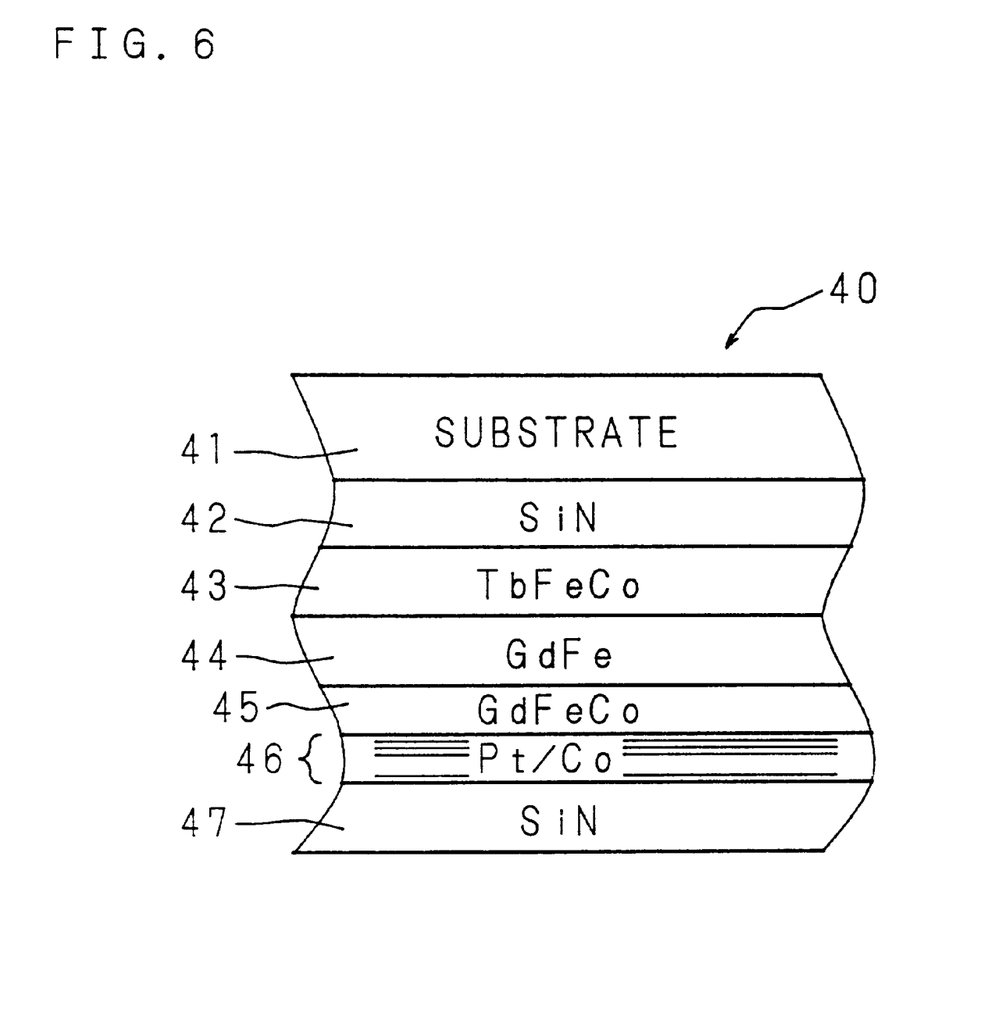
FIG. 6 is a diagram showing a structure of a film of an information recording medium according to embodiment 4.

A case will now be explained in which the information recording medium can be read out by applying a lesser reading magnetic field as that of embodiment 3. FIG. 6 is a diagram showing an arrangement of a film of an information recording medium according to embodiment 4. The information recording medium 40 is a MSR medium of a disk-shape having a substrate 41 with guiding grooves provided on the surface thereof on which there are laminated a protecting layer 42, a recording layer 43 as the first magnetic layer, an intermediate layer 44 as the controlling layer, a first reading layer 45 and a second reading layer 46 as the third magnetic layer, and a protecting layer 47 in this order. The composition, film thickness and producing conditions of each of the layers are shown in TABLE 4. It should be noted that the films of each of the layers are obtained by DC magnetron spattering method, and the recording layer 43 is RE rich with a compensation temperature of approximately 130° C. The first reading layer 45 and second reading layer 46 are exchange coupled films of GdFeCo film and Pt/Co composite film.

On the information recording medium 40 of the above structure, information is thermo-magnetically recorded with the conditions and steps thereof being the same as those in embodiment 1, and the information is read out with the conditions and steps thereof also being the same as those in embodiment 1. The magnetizing condition at the time of reading is the same as that as shown in FIG. 2. When emitting a laser beam to the side of the substrate 41 of the information recording medium 40, a front mask and a rear mask region are formed on a region of the second reading layer 46 corresponding to the laser spot. At an aperture formed between both mask regions, a recording bit of recording layer 43 is transferred which is read out by the magnetic head. The signal level of the readout signal thus obtained is substantially as large as that in embodiment 3, and was capable of reading at a reading magnetic field of 300 Oe. It is obvious from the above results that the same effects could be obtained with the information recording medium 40 of the present embodiment as those of embodiment 3, and that the information recording medium 40 is capable of reading by applying a lesser reading magnetic field as that of embodiment 3.

As it has been explained so far, by providing a first magnetic layer for recording at a closer side with respect to a substrate and a second magnetic layer for reading at a farther side with respect to the substrate, it has been enabled to record a direction of magnetization on the first magnetic layer at the time of thermo-magnetically recording, and to dispose a magnetic head as to be opposing to the second magnetic layer at the time of magneto-optical reading. The present invention is effective in that it is capable of recording a recording bit with a small diameter through thermo-magnetically recording, of transferring the recording bit onto a minute region of the second magnetic layer through a light beam emission at the time of reading, of reading the recording bit at high resolutions and high signal levels through detecting variations in magnetic flux with a magnetic head, and drastically increasing the recording density of the medium thereby.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| | Spattering Pressure, Electric Power | Film Composition | Film Thickness |
|---|---|---|---|
| Protection Layer 12 | 0.5 Pa, 1 kW | SiN, $N_2/(Ar + N_2)$ = 30% | 80 nm |
| Recording Layer 13 | 0.3 Pa, 1 kW | $Tb_{26}Fe_{50}Co_{24}$ | 40 nm |
| Intertmediate Layer 14 | 0.5 Pa, 1 kW | $Gd_{34}Fe_{66}$ | 45 nm |
| Reading Layer 15 | 0.5 Pa, 1 kW | $Gd_{23}Fe_{50}Co_{27}$ | 50 nm |
| Protection Layer 16 | 0.5 Pa, 1 kW | SiN, $N_2/(Ar + N_2)$ = 30% | 20 nm |

TABLE 2

| | Spattering Pressure, Electric Power | Film Composition | Film Thickness |
|---|---|---|---|
| Protection Layer | 0.5 Pa, 1 kW | SiN, $N_2/(Ar + N_2)$ = 30% | 80 nm |
| Recording Layer 23 | 0.3 Pa, 1 kW | $Dy_{24}Fe_{50}Co_{26}$ | 40 nm |
| Intermediate Layer 24 | 0.5 Pa, 1 kW | SiN, $N_2/(Ar + N_2)$ = 30% | 15 nm |
| Reading Layer 25 | 0.5 Pa, 1 kW | $Gd_{26}Fe_{50}Co_{24}$ | 50 nm |
| Protection Layer | 0.5 Pa, 1 kW | SiN, $N_2/(Ar + N_2)$ = 30% | 20 nm |

TABLE 3

| | Spattering Pressure, Electric Power | Film Composition | Film Thickness |
|---|---|---|---|
| Protection Layer 32 | 0.5 Pa, 1 kW | SiN, $N_2/(Ar + N_2)$ = 30% | 80 nm |
| Recording Layer 33 | 0.3 Pa, 1 kW | $Tb_{26}Fe_{50}Co_{24}$ | 40 nm |
| Intermediate Layer 34 | 0.5 Pa, 1 kW | $Gd_{34}Fe_{66}$ | 45 nm |
| Reading Layer 35 | Pt: 0.5 Pa, 1 kW Co: 0.5 Pa, 0.8 kW | Pt/Co | 50 nm |
| Protection Layer 36 | 0.5 Pa, 1 kW | SiN, $N_2/(Ar + N_2)$ = 30% | 10 nm |

TABLE 4

| | Spattering Pressure, Electric Power | Film Composition | Film Thickness |
|---|---|---|---|
| Protection Layer 42 | 0.5 Pa, 1 kW | SiN, $N_2/(Ar + N_2)$ = 30% | 80 nm |
| Recording Layer 43 | 0.3 Pa, 1 kW | $Tb_{26}Fe_{50}Co_{24}$ | 40 nm |
| Intermediate Layer 44 | 0.5 Pa, 1 kW | $Gd_{34}Fe_{66}$ | 45 nm |
| Reading Layer | | | |

TABLE 4-continued

| | Spattering Pressure, Electric Power | Film Composition | Film Thickness |
|---|---|---|---|
| 1st 45 | 0.5 Pa, 1 kW | $Gd_{26}Fe_{50}Co_{24}$ | 20 nm |
| 2nd 46 | Pt: 0.5 Pa, 1 kW<br>Co: 0.5 Pa, 0.8 kW | Pt/Co | 30 nm |
| Protection Layer 47 | 0.5 Pa, 1 kW | $SiN, N_2/$<br>$(Ar + N_2) = 30\%$ | 10 nm |

What is claimed is:

1. An information recording medium comprising:
   a substrate;
   a recording layer in which information is thermo-magnetically recorded; and
   a reading layer having a temperature characteristic which allows the transfer of the direction of magnetization on the recording layer thereto by exchange coupling force; wherein the recording layer is located nearer to the substrate than the reading layer.

2. An information recording medium reading a recording bit which is smaller in size than a spot diameter of an emitted light beam, the information recording medium comprising:
   a substrate;
   a first magnetic layer for thermo-magnetically recording;
   a second magnetic layer having a temperature characteristic by which a direction of magnetization recorded on the first magnetic layer is transferred thereon by magnetic coupling force; and
   a controlling layer provided between the first magnetic layer and the second magnetic layer for controlling the magnetic coupling force,
      wherein the first magnetic layer is located nearer to the substrate than the second magnetic layer.

3. The information recording medium according to claim 1, wherein the recording layer includes Tb, Fe, and Co.

4. The information recording medium according to claim 1, wherein the recording layer includes Dy, Fe, and Co.

5. The information recording medium according to claim 1, wherein the reading layer includes Gd, Fe, and Co.

6. The information recording medium according to claim 1, wherein the reading layer includes a composite film comprised of Pt and Co.

7. The information recording medium according to claim 2, wherein the first magnetic layer includes Tb, Fe, and Co.

8. The information recording medium according to claim 2, wherein the first magnetic layer includes Dy, Fe, and Co.

9. The information recording medium according to claim 2, wherein the second magnetic layer includes Gd, Fe, and Co.

10. The information recording medium according to claim 2, wherein the second magnetic layer includes a composite film comprised of Pt and Co.

11. The information recording medium according to claim 2, wherein the controlling layer includes Gd and Fe.

12. The information recording medium according to claim 2, wherein the controlling layer is of a non-magnetic material.

13. A reading method of an information recording medium comprising at least a first thermo-magnetically recorded magnetic layer and a second magnetic layer provided on a substrate, the reading method comprising the steps of:
   emitting a light beam from a side of the substrate so that a direction of magnetization recorded on the first magnetic layer is transferred onto the second magnetic layer;
   detecting variations in magnetic flux on a region of the second magnetic layer corresponding to an irradiated region of the light beam by means of a magnetic head which moves relative to the information recording medium; and
   reading an information recorded in the information recording medium based on the detected results.

14. The reading method of the information recording medium according to claim 13, wherein
   the first magnetic layer for thermo-magnetically recording is located nearer to the substrate than the second magnetic layer having a temperature characteristic by which a direction of magnetization recorded on the first magnetic layer is transferred thereon by magnetic coupling force; and
   the magnetic head is arranged as to be opposing to a side opposite to the substrate.

15. The reading method of the information recording medium according to claim 13, wherein
   the information recording medium reads a recording bit smaller in size than a spot diameter of an emitted light beam by further providing a controlling layer between the first and second magnetic layers for controlling the magnetic coupling force;
   the first magnetic layer for thermo-magnetically recording is located nearer to the substrate than the second magnetic layer having a temperature characteristic by which a direction of magnetization recorded on the first magnetic layer is transferred thereon by magnetic coupling force; and
   the magnetic head is arranged as to be opposing to a side opposite to the substrate.

16. A method of reading an information recording medium having at least a first magnetic layer and a second magnetic layer provided on a substrate, the reading method comprising the steps of:
   detecting variations in magnetic flux on a region of the second magnetic layer on which a direction of magnetization recorded on the first magnetic layer is transferred, by means of a magnetic head which opposes a side opposite to the substrate and moves relative to the information recording medium; and
   reading information recorded in the information recording medium based on the detected results,
      wherein the first magnetic layer for thermo-magnetic recording is located nearer to the substrate than the second magnetic layer, a direction of magnetization recorded on the first magnetic layer being transferred to the second magnetic layer by magnetic coupling force.

17. An information recording medium comprising:
   a substrate;
   a first magnetic layer for thermo-magnetically recording;
   a second magnetic layer having a temperature characteristic by which a direction of magnetization recorded on the first magnetic layer is transferred thereon by magnetic coupling force; and
   a controlling layer provided between the first magnetic layer and the second magnetic layer for controlling the magnetic coupling force,
      wherein the first magnetic layer is located nearer to the substrate than the second magnetic layer.

* * * * *